United States Patent [19]

Newman et al.

[11] 4,308,152

[45] Dec. 29, 1981

[54] INJECTION WATER TREATMENT TO PREVENT COMPACTION AND PERMEABILITY REDUCTION IN CARBONATE FORMATIONS

[75] Inventors: George H. Newman, Placentia; James R. Wood, La Habra Heights, both of Calif.

[73] Assignee: Chevron Research Company, San Francisco, Calif.

[21] Appl. No.: 132,925

[22] Filed: Mar. 24, 1980

[51] Int. Cl.³ .............................................. E21B 43/22
[52] U.S. Cl. ................................ 252/8.55 D; 166/252; 166/275
[58] Field of Search ........... 252/8.55 D, 8.5 A, 8.5 B, 252/8.55 R; 166/252, 275

[56] References Cited

U.S. PATENT DOCUMENTS

| | | | |
|---|---|---|---|
| T903,015 | 10/1972 | McMillen | 166/252 |
| 3,042,611 | 7/1962 | Patton | 252/8.55 X |
| 3,203,480 | 8/1965 | Froning | 252/8.55 X |
| 3,675,716 | 7/1972 | Farmer et al. | 166/275 |
| 4,008,165 | 2/1977 | Maddox et al. | 252/8.55 |

*Primary Examiner*—Herbert B. Guynn
*Attorney, Agent, or Firm*—J. A. Buchanan, Jr.; Edward J. Keeling; G. W. Wasson

[57] ABSTRACT

A process for avoiding compaction and permeability reduction in carbonate formations when fluids are injected into such formations in a manner to produce hydrocarbons from such formations. The process involves controlling the pH and the state of mineral saturation of the injection fluids.

10 Claims, No Drawings

INJECTION WATER TREATMENT TO PREVENT COMPACTION AND PERMEABILITY REDUCTION IN CARBONATE FORMATIONS

BACKGROUND OF THE INVENTION

1. Field of the Invention

This invention relates to a method for preventing compaction and permeability reduction in a carbonate formation into which a fluid is being injected.

2. Prior Art

It has been known to inject materials into subsurface formations to maintain permeability by placing proppant materials in the permeability passages within the formation thus maintaining existing permeability. It has also been known to specifically design the chemistry of injection fluids to prevent damage to the formation or to its permeability by solidifying the existing formation structure.

In prior art schemes, of which we are aware, the foregoing schemes have been applied to treatment of the more frequently encountered subsurface petroleum containing formations, but we are not aware of any successful schemes that have been applied to petroleum containing carbonate formations.

Damage to permeability in subsurface formations may be caused by several conditions related to the fluids injected into the formation. One such damage can be caused by collapse or compaction of the formation because of reaction between the formations and the injected fluid.

We have discovered a method for preventing compaction in carbonate formations. The method thus provides a means for avoiding compaction and for maintaining permeability in carbonate formations and provides a means for potentially increasing or at least maintaining petroleum production from petroluem containing carbonate formations.

SUMMARY OF THE INVENTION

In accordance with the method proposed herein, compaction of carbonate formations is prevented by treating fluids injected into the formation so as to increase the pH of the injection fluid to make the fluid more alkaline. The fluid may be further treated to insure that it maintains the desired alkalinity when injected into the carbonate formation. The method is particularly applicable to the treatment of sea water when used as an injection fluid in carbonate formations.

DESCRIPTION OF PREFERRED EMBODIMENTS

In accordance with the present invention compaction of carbonate formations due to reaction with injection fluids can be prevented by treating the aqueous based injection fluids in the following manner. First sufficient soluble caustic material is added to the fluid to increase the pH to an alkaline level preferably in the pH range of 8 to 10. The added caustic material may be sodium hydroxide, potassium hydroxide or the like. Then adding sufficient buffer material, such as soluble carbonate (i.e., $NaHCO_3/Na_2CO_3$), phosphates, borates, or the like, to hold the pH of the injection fluid at the desired level. Then adding sufficient calcium or carbonate ions to saturate the injection fluid with calcium carbonate (calcite/aragonite). This material may be added as $CaCl_2$, $Na_2CO_3$, $CaCO_3$, or the like.

When prepared in the above manner, the injection fluid may be injected into a carbonate formation with little or no resulting effect on the permeability of the formation due to compaction. In a laboratory experiment fluid treated to obtain a pH of 9.2 was injected into an oil saturated chalk that was under a hydrostatic stress of 3,900 psi. No significant compaction of the chalk was observed.

While it may appear obvious to treat fluids which are not to be injected into formations in a manner to make the potential reaction between the fluid and the formation non-destructive, it is believed that prior art technology has not recognized the relationship between chemistry changes and formation rock strengths, and, we believe the prior art has taught against treating such fluids by raising the pH because that treatment would be known to cause precipitation of particles from the fluid which in all probability would cause reduction in formation permeability as a result of blocking the permeable paths through the formation. In light of the prior art teaching away from the process herein proposed, we now propose to prepare injection fluids with increased pH and saturated chemical composition.

The method herein proposed has further particular application to the use of sea water as an injection fluid and the treatment of that fluid in accordance with the method herein stated. Sea water is, of course, the most readily available fluid in an offshore installation and, in the case of certain offshore petroleum production opportunities, the combination of a readily available fluid for injection and a carbonate formation presents a real application for the method herein disclosed.

In the North Sea there are carbonate formations (referred to as chalk formations) that are known to contain producible petroleum deposits. In some producing techniques it is desirable to inject fluids into those formations to assist in the production of the petroleum. However, when sea water is injected into those formations, they tend to collapse with the result that the permeability of the formation is substantially destroyed and the production of the petroleum is practically impossible. With the process herein described, sea water may be treated to make it non-detrimental to the formation. The formations do not collapse or compact and the permeability is maintained.

The treatment process comprises the steps of:

(a) adding sufficient caustic material (such as NaOH) to increase the pH of the fluid to value within the range of 8.0 to 10, (b) the fluid is then treated with further additives that are specifically included to maintain the pH at the desired level. These materials may include soluble carbonates (such as $NaHCO_3$) phosphates or borates to prevent any further change in the pH, (c) then the injection fluid is treated by adding sufficient calcium and/or carbonate ions to saturate the fluid with calcium carbonate. Such additives may include $CaCl_2$, $Na_2CO_3$ or $CaCO_3$, (d) mixing of the chemical additives with the injection water is followed by allowing any formed precipitates to settle from the injection water prior to filtration. The settling and filtration are required to remove any remaining solids that might physically plug the formation. The size of the solids removed by filtration may vary and depend upon the formation filtration requirement to prevent significant physical plugging.

The treated sea water then is in a chemical equilibrium that will prevent it from reacting extensively with the carbonate formation containing the producible petroleum and the formation will not compact resulting in a reduction of the formation permeability. The treated sea water then may be injected into the formation at any formation temperatures and pressures and may function as a pusher fluid or flooding fluid to move the petroleum deposits along the permeability paths through the formation.

Sea water treated in the foregoing manner required the addition of 0.0108% (weight percent) of sodium hydroxide and the addition of 0.021% (weight percent) of sodium bicarbonate to increase the pH to 9.2.

The specific injection or production method employed is not an essential part of the method herein claimed. Separate injection and producing wells may be employed and/or a single well may function both for injection and production. The purpose of the present method is to avoid compaction of certain petroleum containing formations by treating the fluids injected into those formations without particular regard to the injection and production equipment and techniques.

Buffer solutions are well known in the aqueous chemistry and are described in "Handbook of Chemistry" and Physics, 53rd Edition, published by The Chemical Rubber Company at pages D103–D105. The pH of sea water as shown in page F-169 of the above publication is above 8 and in the range of 8 to 9. Increasing the pH of sea water as herein disclosed would preferably change the pH within the range of 8 to 10.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

What is claimed is:

1. A process for avoiding compaction and permeability reduction of a carbonate formation containing producible hydrocarbons and into which an aqueous fluid is being injected comprising treating said aqueous injection fluid in the steps of:
    (a) treating said injection fluid with chemical additives to establish a pH for said injection fluid within the range of 8.0 to 10.0,
    (b) adding to said treated injection fluid sufficient buffer material to hold the pH of said treated injection fluid at said established level,
    (c) adding to said treated, buffered injection fluid sufficient calcium and carbonate ions to saturate said injection fluid with calcium carbonate; and
    (d) injecting said treated, buffered, saturated injection fluid into said carbonate formation.

2. The process of claim 1 wherein said additives for treating said injection fluid are soluble caustic materials.

3. The process of claim 2 wherein said soluble caustic material is sodium hydroxide.

4. The process of claim 2 wherein said soluble caustic material is sodium bicarbonate.

5. The process of claim 1 wherein said added buffer material is a soluble carbonate, phosphate or borate.

6. The process of claim 1 wherein said calcium and carbonate ions are selected from the group consisting of $CaCl_2$, $Na_2CO_3$, $CaCO_3$.

7. A process for avoiding compaction and permeability reduction of a carbonate formation containing producible hydrocarbons and into which sea water is to be injected comprising the steps of:
    (a) treating said sea water by adding to said sea water sufficient caustic material to establish the pH of said treated sea water within the range of 8.0 to 10,
    (b) adding suitable buffer material to hold said pH of said treated sea water at said established pH,
    (c) adding to said buffered sea water sufficient amounts of calcium and carbonate ions to saturate said sea water,
    (d) and injecting said treated, buffered sea water into said carbonate formation.

8. A process for reducing or preventing compaction and/or permeability reduction of chalk formations containing producible hydrocarbon deposits when said hydrocarbons are produced from said formations with a sea water flood comprising the steps of:
    (a) mixing a soluble caustic material with said sea water to produce a modified sea water having a pH above neutral and within the range of 8.0 to 10.0,
    (b) adding sufficient buffer material to said modified sea water to maintain said pH of the sea water substantially at said pH established in step (a),
    (c) adding to said buffered sea water sufficient amounts of calcium and carbonate ions to saturate said sea water,
    (d) removing precipitation, if any, from said modified buffered sea water, and
    (e) flooding said producible hydrocarbons from said formation with said modified buffered sea water.

9. A injection fluid for use in a water flood of a chalk reservoir containing producible hydrocarbons comprising sea water treated to have having its pH adjusted to a pH within the range of 8.0 to 10.0, having sufficient soluble buffer material added to maintain said pH of said water, and saturated with calcium carbonate, said treated sea water having been settled and filtered to remove particles which could plug said chalk reservoir.

10. The injection fluid of claim 9 wherein the adjusted pH is 9.2.

* * * * *